Aug. 1, 1933.  H. A. TOULMIN, JR  1,920,482
BELT
Filed Sept. 29, 1931   2 Sheets-Sheet 1

Inventor
HARRY A. TOULMIN, Jr.
Toulmin & Toulmin
Attorneys

Aug. 1, 1933.  H. A. TOULMIN, JR  1,920,482
BELT
Filed Sept. 29, 1931   2 Sheets-Sheet 2

Inventor
HARRY A. TOULMIN, Jr.,
By
Toulmin & Toulmin
Attorneys

Patented Aug. 1, 1933

1,920,482

UNITED STATES PATENT OFFICE 1,920,482

BELT

Harry A. Toulmin, Jr., Dayton, Ohio, assignor to the Dayton Rubber Manufacturing Company, Dayton, Ohio, a Corporation of Ohio Application September 29, 1931
Serial No. 565,834

1 Claim. (Cl. 74—63)

My invention relates to belts.

It is the object of my invention to provide a belt of combined fabric and rubber of integral construction having sections thereof at spaced intervals of greater elasticity and with greater capacity of compression.

It is a further object to provide such sections vulcanized to and an integral part of the belt either on the interior of the belt in the compression area or on the exterior of the belt in the tension area, or both.

It is a further object to provide a belt having a longitudinal inextensible axis or one substantially inextensible, together with sections of material integrally formed on one or both sides thereof of greater yielding capacity than the main body of the belt on the respective sides of the neutral axis.

Heretofore in the art difficulty has been encountered with the compression and tension areas when such areas have been made of woven fabric primarily of straight-laid woven fabric, which has a tendency to buckle when compressed and which it is difficult to stretch when under tension. This results in either forcing the belt out of the V-shaped pulley in which the belt may be riding, or may result in forcing it into the pulley to a degree not intended with a resulting deformation of the belt.

It is a further object of my invention to provide a belt which will have a tendency, when it is slightly stretched or under tension, to grip the pulley whether the pulley is a flat pulley or a V-shaped pulley, as the internal sections of highly resilient material will resist their extension due to the tension under which the belt is put, causing the belt to cling to the pulley so gripped.

Referring to the drawings.

Figure 1:
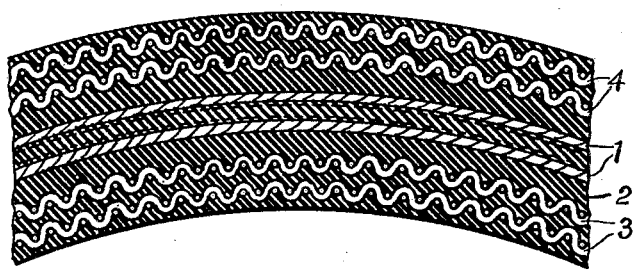
Figure 1 is a vertical section on the line 1—1 of Figure 2 through a typical belt construction.
Figure 2:
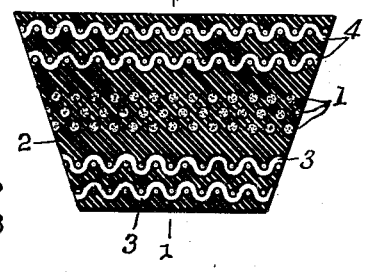
Figure 2 is a transverse section on the line 2—2 of Figure 1.
Figure 3:
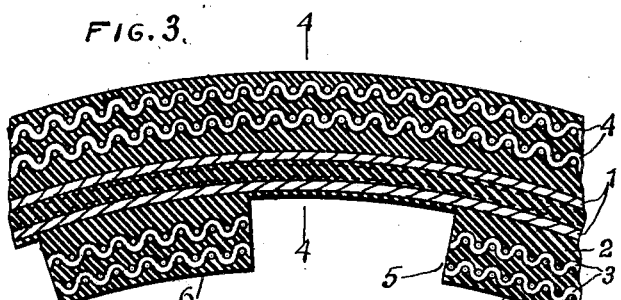
Figure 3 shows the belt in section after internal teeth have been formed in the belt by cutting away sections of the compression area.
Figure 4:
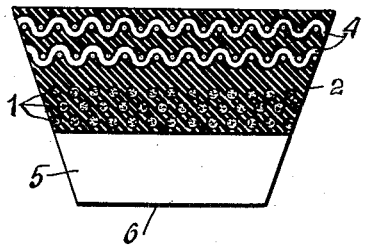
Figure 4 is a section on the line 4—4 of Figure 3.
Figure 5:
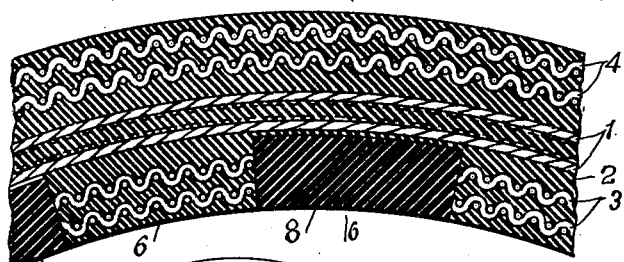
Figure 5 is a section through the belt showing the rubber sections vulcanized into the belt which are the areas of greater elasticity.
Figure 6:
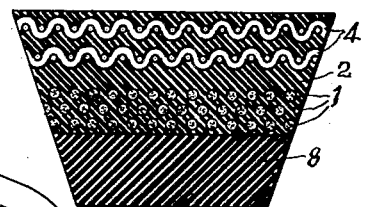
Figure 6 is a section on the line 6—6 of Figure 5.
Figure 7:
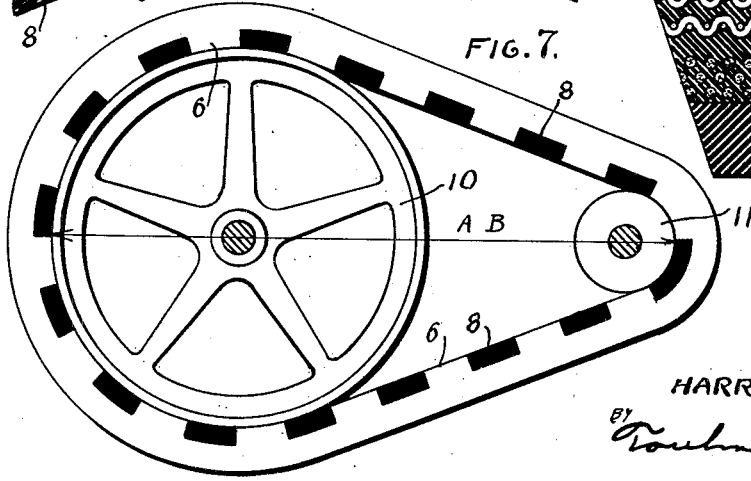
Figure 7 is a side elevation of the belt as applied to pulleys.
Figure 8:
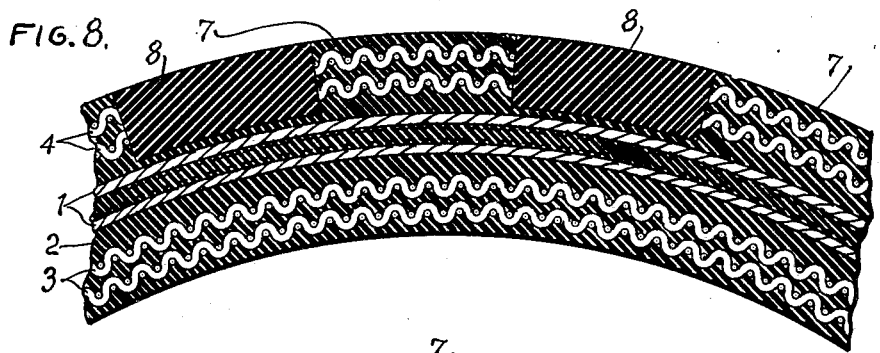
Figure 8 is a section similar to Figure 5 showing the sections of greater yieldability in the tension area.
Figure 9:
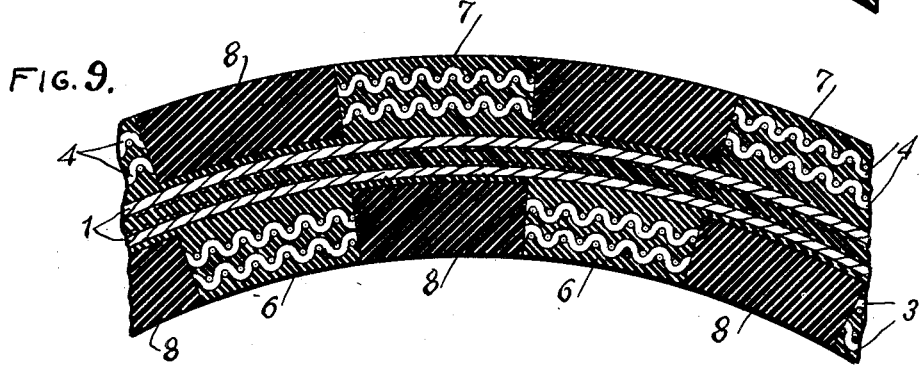
Figure 9 is a similar view showing the yielding sections in alternate positions in the compression and tension areas.
Figure 10:
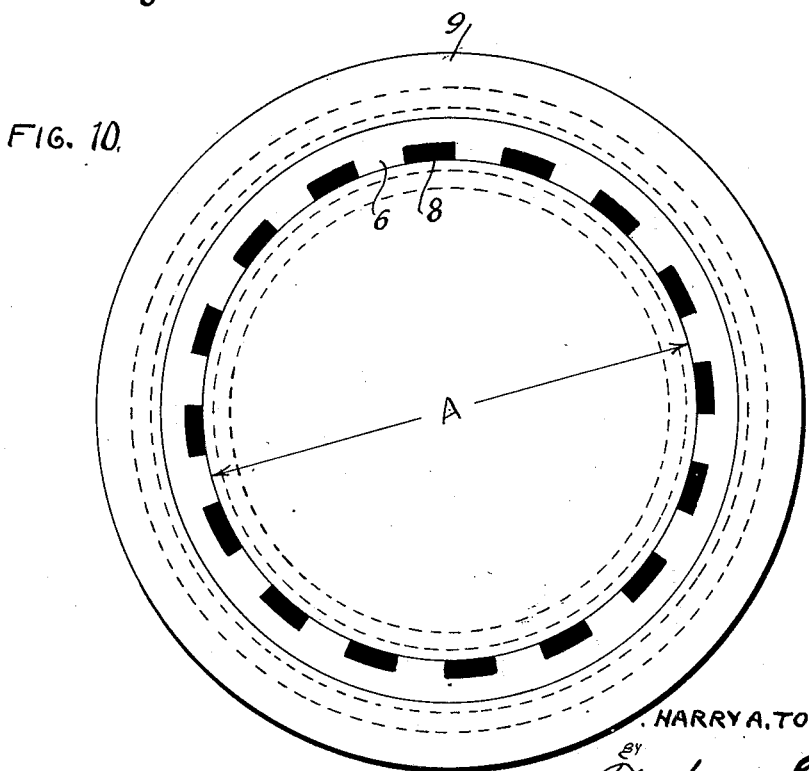
Figure 10 shows the belt in position in a mold half where it is molded and vulcanized.

Referring to the drawings in detail, 1 indicates the cords circumferentially wound in layers to form the neutral axis of the belt. These layers are embedded in the rubber 2, the lower portion of which is provided with a plurality of layers of fabric 3 which may be either bias-laid or straight-laid. The upper part of the belt is provided with a plurality of layers of similar fabric 4. The area of the belt below the neutral axis is the compression area and the area above the neutral axis is the tension area.

After the belt has been formed in any suitable manner as being built up on a drum, sections are cut from the compression area as at 5 leaving tooth projections 6. Likewise, sections may be cut from the tension area leaving teeth 7.

The cutaway portions of the respective areas are then filled with highly resilient rubber bodies 8 and the composite belt is placed in a mold 9 having a diameter indicated at A where the belt is vulcanized.

When the belt is placed upon the pulleys, such as 10 and 11, if the distance A—B, due to the tension on the belt, is greater than A, the sections 8 will be stretched and the resistance to stretch will cause the belt to cling to either the pulley face, if the pulley is a flat pulley, or to the pulley side walls, if it is a V-shaped pulley.

On the other hand, if the belt is not stretched in any way, the sections 8 facilitate passing over small pulleys and the utilization of short center drives as the belt is rendered highly flexible in its bending on transverse axes without being longitudinally extensible.

When passing over pulleys where the tension fabric layers 4 would resist the movement of the belt, the highly resilient areas in the section will permit of the stretching of the belt in the tension area and will permit of its bending on transverse axes.

It will be understood that I desire to comprehend within my invention such modifications as may be necessary to adapt it to varying conditions and uses.

Having thus fully described my invention, what I claim as new and desire to secure by Letters Patent, is:

In a belt, a belt body having means arranged centrally thereof for resisting longitudinal extension of the belt, and means on either side thereof for resisting longitudinal compression of the belt, and highly resilient inserts between sections of the last mentioned means.

HARRY A. TOULMIN, JR.